United States Patent [19]

Masuda et al.

[11] Patent Number: 4,788,565
[45] Date of Patent: Nov. 29, 1988

[54] COMPOSITE CAMERA APPARATUS COMPOSED OF VIDEO CAMERA AND STILL CAMERA WITH STROBE DEVICE

[75] Inventors: Akira Masuda; Yoshiaki Nakayama, both of Tokyo, Japan

[73] Assignees: Sony Corporation; Fuji Photo Film, Co., both of Tokyo, Japan

[21] Appl. No.: 133,278

[22] Filed: Dec. 15, 1987

[30] Foreign Application Priority Data

Dec. 27, 1986 [JP] Japan ................................ 61-310666

[51] Int. Cl.$^4$ ............................................. G03B 17/48
[52] U.S. Cl. ..................................... 354/75; 354/145.1
[58] Field of Search ................ 354/75, 76, 145.1, 420, 354/62

[56] References Cited

U.S. PATENT DOCUMENTS 3,546,378 12/1970 Karikawa ......................... 354/75 X
4,412,728 11/1983 Sakane et al. .................... 354/62 X

FOREIGN PATENT DOCUMENTS

0233736 6/1987 European Pat. Off. .

Primary Examiner—Michael L. Gellner
Attorney, Agent, or Firm—Ronald P. Kananen

[57] ABSTRACT

A composite camera apparatus employing a video camera device, a still camera device and a strobe device. The video camera device includes an electric circuit for picking up video data and processing the video data to record a video signal on a recording medium, such as a video tape. The electric circuit of the video camera apparatus includes means, associated with a strobe device and responsive to initiation of stroboscopic flashing, for controlling the electric circuit for recording the video signal so that a predetermined number of the video data picked-up at the occurrence of stroboscopic flashing, may not be reproduced when the video signal is reproduced by means of a VTR on a video monitor.

15 Claims, 5 Drawing Sheets

COMPOSITE CAMERA APPARATUS COMPOSED OF VIDEO CAMERA AND STILL CAMERA WITH STROBE DEVICE

BACKGROUND OF THE INVENTION

1. Field of the Invention

The present invention relates generally to a composite camera apparatus which facilitates the functions of both a video camera for picking-up video image data for a moving subject and a still camera for picking-up still images of a subject. More specifically, the invention relates to a composite camera apparatus capable of simultaneous functions of video image data pick-up as a video camera and a still image pick-up as a still camera with a strobe device operation. Still more particularly, this invention is directed to a technique for avoiding influence of strobe light to the video image data to be picked up by the video camera, which strobe light will otherwise cause smear or blooming of the picked-up video image as reproduced due to the extra intensity of light.

2. Description of the Background Art

The co-pending U.S. patent application Ser. No. 07/009,813, filed on Feb. 6, 1987, which corresponds to the European Patent Appln. No. 87301066.4, filed on Feb. 6, 1987, discloses a composite camera apparatus functioning as a film camera and a video camera. The composite camera picks up a still image of a subject and produces a still image on a photosensitive film, when it is operated as a still camera. The composite camera also functions to pick up video image data to be produced by means of a video tape recorder (VTR), when it is operated as a video camera.

Throughout the disclosure, the words "video camera" mean a camera functioning for picking up the video image and converting the picked up video image into a video signal to be reproduced by the VTR. The words "video data" are used in the disclosure to represent data picked up by an image pick-up device, such as a CCD image pick-up device, employed in the video camera, and the data converted into the electric signal from the video data will be referred to as a "video signal". On the other hand, the word "still camera" means a camera functioning for picking-up the still image of the subject and forming a still image on a still image recording medium, such as a photosensitive film.

As is well known, in the case of the film type a still camera for forming still image of the subject on the photosensitive film, a strobe device may be required for providing sufficient light intensity for picking-up the still image in the dark. On the other hand, the image pick-up device employed for the video camera has a substantially high photosensitivity so that video data can be picked up in the dark where the still image cannot be picked by the film-type still camera due to lower photosensitivity, unless assisted by a stroboscopic flash. On the other hand, when stroboscopic flashing is effected, the light intensity becomes excessive for the image pick-up device of the video camera causing smear or blooming of the picked-up image.

On the other hand, a shutter chance may be found while picking up video data by means of the video camera. At such occasion, the user may want simultaneous operation of the video camera and the still camera even in the dark for the still camera. In such case, stroboscopic flashing has to be effected for assisting or enabling still image pick-up. When stroboscopic flashing is effected, a corresponding one field of video data may receive excessive light intensity causing smear or blooming. Such field on which smear or blooming exists will be noticeable when the video signal is reproduced by means of the VTR on a video monitor, such as a CRT screen to degrade the reproduced image.

Such problem may be solved or reduced by keeping the video camera lens away from the stroboscopic light source. However, this is not practical since the market needs requires light-weight, handy and compact cameras for convenience of hand-carrying.

SUMMARY OF THE INVENTION

Therefore, it is an object of the present invention to provide a composite camera of a video camera and a still camera, which allows simultaneous operation without causing noticeable degradation of reproduced video image, even when a stroboscopic flash is effected while the video camera is active.

In order to accomplish the aforementioned and other objects, a composite camera apparatus, according to the present invention, employs a video camera device, a still camera device and a strobe device. The video camera device includes an electric circuit for picking up video data and processing the video data to record video signals on a recording medium, such as a video tape. The electric circuit of the video camera apparatus includes means, associated with a strobe device and responsive to initiation of stroboscopic flashing, for controlling the electric circuit for recording the video signals so that a predetermined number of the video data picked up at the occurrence of stroboscopic flashing, may not be reproduced when the video signal is reproduced by means of a VTR on a video monitor.

In order to make the corresponding field or fields of video signals to be reproduced, the means replaces the corresponding field or fields of video signals converted from the picked up video data with a false or dummy signal. Otherwise, the corresponding field or fields of the video signals is inhibited to be recorded on the video tape. By disabling the video signal of the corresponding field to be reproduced on the video monitor, the smear or blooming of the video image picked up at the timing where the stroboscopic flashing is effected, is unnoticeable.

According to one aspect of the invention, a composite camera apparatus comprises a video camera device for picking up a video image for recording a plurality of fields of video signals to be reproduced on a video monitor, a still camera device for picking-up a still image for recording on a still image recording medium, a strobo-flashing device cooperative with the still camera device for synchronous operation for emitting strobo-flashing light in response to still image pick-up operation of the still camera device, and means, incorporated in the video camera device, for modifying video image data in a field of the video signals picked-up at a timing of the strobo-flashing operation for avoidance of an influence of high intensity light.

According to another aspect of the invention, a composite camera apparatus comprises a video camera device for picking up a video image for recording a plurality of fields of video signals to be reproduced on a video monitor, a still camera device for picking up a still image for recording on a still image recording medium, a strobo-flashing device cooperative with the still camera device for synchronous operation for emitting strobo-flashing light in response to the still image pick-up operation of the still camera device, and means, incorporated in the video camera device, for modifying the video image data in a field of the video signal picked up at a timing of the strobo-flashing operation by replacing the corresponding field of video signal with a preset dummy signal for avoidance of the influence of high intensity light.

According to a further aspect of the invention, the composite camera apparatus comprises a video camera device for picking up a video image for recording a plurality of fields of video signals to be reproduced on a video monitor, a still camera device for picking up a still image for recording on a still image recording medium, a strobo-flashing device cooperative with the still camera device for synchronous operation for emitting strobo-flashing light in response to still image pick-up operation of the still camera device, and means, incorporated in the video camera device, for modifying the video image data in a field of the video signal picked up at a timing of the strobo-flashing operation by lowering gain of the corresponding field of the video signal for a given magnitude for avoidance of influence of high intensity light.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

In the drawings:

FIGS. 3A, 3B and 3C are timing charts showing the relationship with video signal and stroboscopic operation, in which

DESCRIPTION OF THE PREFERRED EMBODIMENTS

Figure 1:
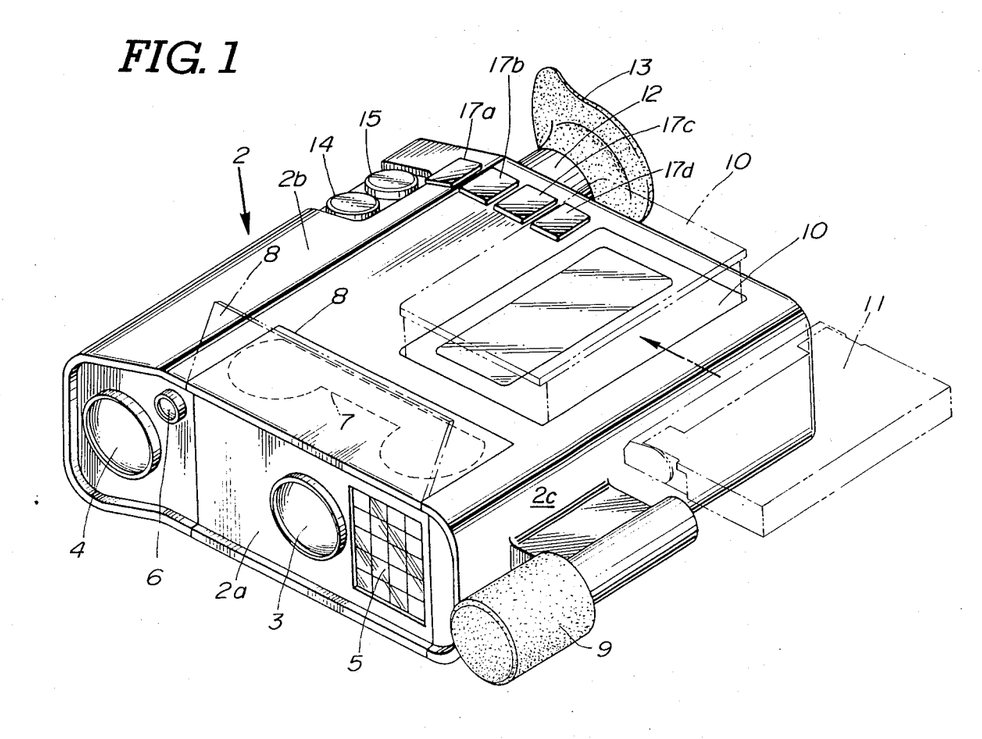
FIG. 1 is a perspective view of the preferred embodiment of a composite camera apparatus which is composed of a video camera and a film-type still camera with a strobe device, according to the invention.
Figure 2:
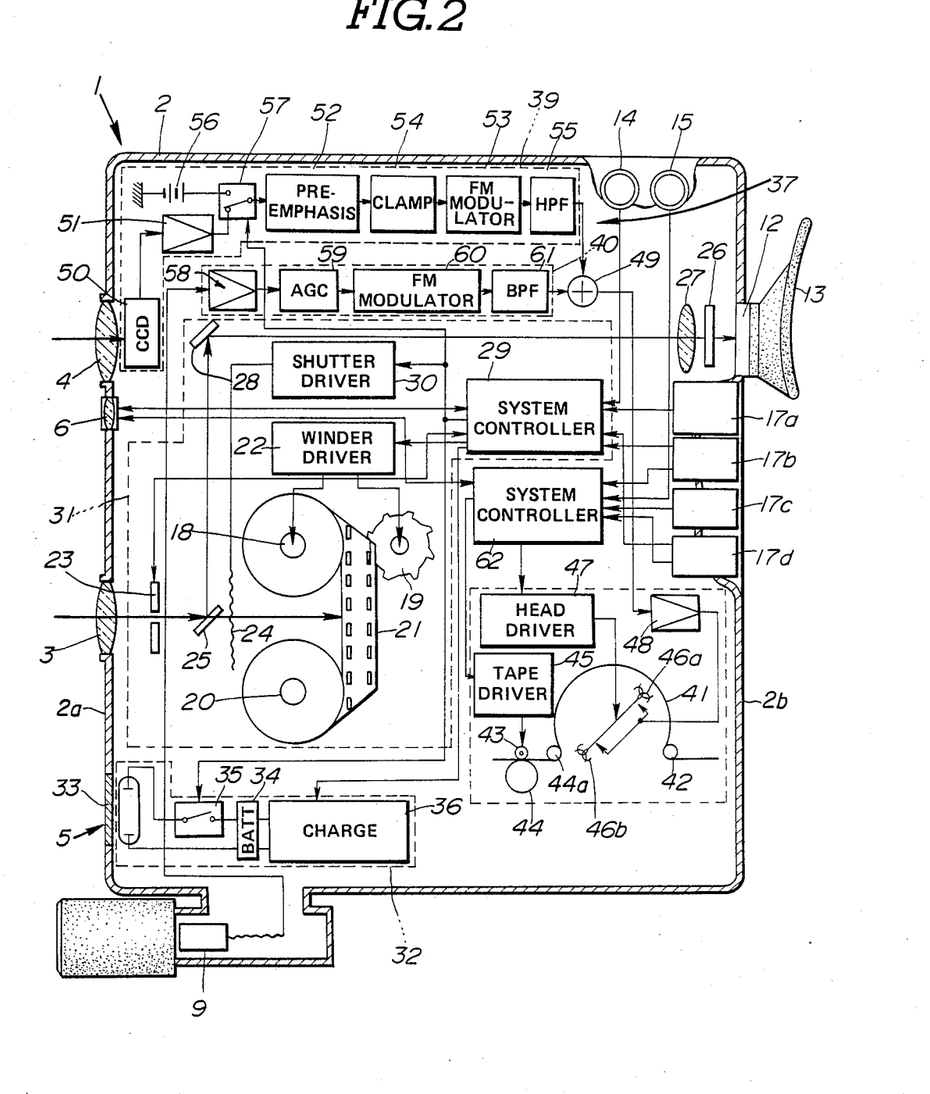
FIG. 2 is a schematic block diagram of the preferred embodiment of the composite camera apparatus of FIG. 1.

Referring now to the drawings, particularly to FIGS. 1 and 2, the preferred embodiment of a composite camera apparatus 1 is formed into a light-weight, handy and compact construction for convenience of hand-carrying. The composite camera apparatus 1 is specifically designed for functioning as a video camera and a still camera and allows simultaneous operation of both cameras. The video camera device and the film-type still camera device are installed in a common camera body 2. The camera body 2 has a front end wall 2a, a rear end wall 2b and side walls 2c (only one side wall is shown) and is formed into a thin box-shaped configuration. A camera lens assembly 3 of the still camera and a camera lens assembly 4 for the video camera are installed on the front end wall 2a of the camera body 2.

Through out the disclosure, the lens assembly 3 of the still camera device will be referred to as "still camera lens" and the lens assembly 4 of the video camera device will be referred to as "video camera lens".

It should be appreciated, though the drawings does not clearly illustrate the exact construction, that the still camera lens may include a known lens drive mechanism for adjusting the focusing point in order to facilitate an automatic focusing function. On the other hand, the video camera lens may also include an automatic focusing mechanism in known construction and an automatic zooming mechanism. However, such automatic focusing ability and automatic zooming ability should be appreciated as not an essential feature of the invention and therefor, the invention should not be limited to the composition including such mechanisms.

Adjacent the still camera lens 3, a strobe light emitting window 5 is provided on the front wall. On the other hand, adjacent the video camera lens 4, an optical distance sensor 6 is provided for measuring the distance to an object for facilitating the automatic focusing function.

A photosensitive film receptacle cavity 7 is defined adjacent the front wall 2a and at the position opposite the still camera lens 3. The film receptacle opening 7 opens at one of the side walls of the camera body 2 so that a photosensitive film can be inserted therein. The end opening of the film receptacle cavity 7 is openably closed by means of a closure lid 8. The closure lid 8 is hinged at the front edge thereof so that it may be hinged to the open position as shown by the phantom line in FIG. 1 to allow insertion and removal of the photosensitive film.

In the preferred construction, the photosensitive film is in a form of a film cassette or magazine for convenience of inserting and removing the photosensitive film. However, the present invention will be applicable for any type of photosensitive film and thus is not limited to the cassette type film.

A microphone 9 is installed on the camera body for recording an audio sound for audio recording. The audio sound will be recorded on a video tape with a video signal to be reproduced therewith in the per se well known manner.

A cassette holder 10 for receiving a video tape cassette 11 is provided in one side of the camera body 2. The cassette holder 10 is movable between a retracted loading position and an extracted release position. At the release position, the cassette holder 10 exposes a cassette receptacle space outside of the camera body 2 so that the video tape cassette 11 can be inserted therein and removed therefrom. The cassette holder 10 may be pushed into the loading position from the release position to load the video tape on a video tape recording mechanism installed in the composite camera apparatus.

A view finder 12 with an eye cup 13 is installed on the rear wall 2b of the camera body 2. Adjacent the view finder, a shutter button 14, a record start button 15 and a strobe control button are arranged. Furthermore, various function buttons 17 for an automatic focusing function, a white balance function, a date insertion function and the like are arranged on the camera body. In the shown embodiment, the function button 17a is designed to be turned ON for inputting the strobe device ON-set command. Namely, while the function button 17a is set at the ON position, the strobe device 32 is maintained at the operative condition for emitting stroboscopic light in response to depression of the shutter button 14. The function button 17b is designed for inputting an automatic focusing command for operating an automatic focusing servo system which may be associated with the still camera lens 3 and/or the video camera lens 4 to shift the lens positions for facilitating the automatic focusing function. The function button 17c is designed for entering a white balancing command for making a white balance circuit (not shown) in the video camera device for adjusting white balance. The function button 17d is schematically illustrated as a singular push button but can be in any form for setting a date. The date setting arrangement in the still camera is well known to those skilled in the art and thus need not be explained in detail.

Details of the video camera device and the still camera device will be described herebelow with reference to FIG. 2.

A film take-up spool 18 and a film supply spool 20 are installed within the film receptacle cavity 7. Adjacent a path of the photosensitive film 21 in the film receptacle cavity, a film feeding sprocket 19 is provided. The tape-up spool 18 and the film feeding sprocket 19 are driven by a driver mechanism 22 in synchronism to each other. By driving the tape-up spool 18 and the sprocket 19, an automatic winding function for automatically winding the film can be facilitated.

The still camera device also includes an iris mechanism 23 and a shutter mechanism 24 interposed between the still camera lens 3 and the film 21. A half mirror 25 is interposed between the iris mechanism 23 and the shutter mechanism 24 so as to reflect part of the light entering through the still camera lens 3. The reflected light component which contains an image of the object to be picked up is transferred to the view finder 12 via a deflector mirror 28, an imaging lens 27 and an imaging screen 26. Namely, with the shown construction, the image of the object is projected or formed by means of the imaging lens 27 on the imaging screen 26.

The shutter mechanism 24 is associated with a shutter driver circuit 30 which is, in turn, connected to a still camera system controller 29. The system controller 29 is designed for controlling operation of the shutter mechanism 24 in response to depression or manual operation of the shutter button 14. The system controller 29 controls operation of the driver circuit 22 of the automatic film winder mechanism for winding the film and thus feeding the film segments. The system controller 29 may control the timing of the film winding operation of the film winder mechanism in relation to the shutter operation timing. Since the shown embodiment employs the cartridge or magazine type film, the rewinding operation of the film may not be required for the still camera device. However, when the composite camera of the shown embodiment uses the normal type film which is available in a form wound around a spool, the rewinding operation may be performed by the film winding mechanism under control of the system controller 29 in response to a command input through a rewinding button.

Furthermore, the system controller 29 controls operation of the strobe device 32. The strobe device 32 comprises a stroboscopic lamp 33, a battery 34, a switch 35 and a charge circuit 36. The system controller 29 is associated with the switch 35 and the charge circuit 36. The system controller 29 makes the charge circuit 36 active to accumulate electric power for supplying substantially high voltage to the stroboscopic lamp when the strobe control switch is set at an ON position. On the other hand, system controller 29 turns ON the switch 35 in synchronism with the operation of the shutter mechanism 24. By turning ON, the stroboscopic light is irradiated onto the object via the strobe light emitting window 5.

On the other hand, the video camera device includes a tape drive mechanism which includes a known tape loading mechanism for loading the video tape 42. The loading mechanism wraps the video tape 42 onto a periphery of a rotary head drum carrying magnetic heads 46a and 46b. The tape drive mechanism also includes a capstan 43, a pinch roller 44, and guide rollers 44a to drive the tape across the rotary head drum. The capstan 43 is associated with a tape drive circuit 45 to control tape drive speed, tape drive direction and so forth. On the other hand, the magnetic heads 46a and 46b are connected to a head drive circuit 47 for controlling recording and reproducing operation of the magnetic heads.

A CCD image pick-up device 50 is provided behind the video camera lens 4 to receive video data of the image of the object and converts the video data into a video signal. The video signal output from the CCD image pick-up device 50 is processed through an amplifier 51, a pre-emphasis circuit 52, a clamping circuit 54, an FM modulator circuit 53, and a high-pass filter circuit 55. The pre-emphasis circuit 52 receives the amplified video signal and emphasizes the high frequencies of the video signal thereby improving the S/N ratio. The clamping circuit 54 is arranged between the pre-emphasis circuit 52 and the FM modulator circuit 53 and fixes the relationship between the video signal and carrier so that FM modulation in the FM modulator circuit 53 can be performed. The FM modulator circuit 53 thus performs FM frequency modulation to establish a luminance signal. The luminance signal is fed to the high-pass filter 55 allowing mixing of chrominance signal from a chrominance signal processing system (not shown) to the luminance signal.

On the other hand, the microphone 9 is connected to an audio signal processing circuit 40 which includes an amplifier 58, an automatic gain control (AGC) circuit 59, an FM modulation circuit 60 and a band-pass filter 61. The band-pass filter 61 is designed to filter out the chrominance signal band and luminance signal band and pass the audio signal in a band intermediate between the chrominance signal band and the luminance signal band.

The video signal, containing the chrominance signal component and the luminance signal component, and the audio signal are mixed at a mixer 49 and fed to the magnetic heads 46a and 46b via a head driver circuit 47 and a recording amplifier 48. Therefore, the video signal and audio signal are recorded on the video tape 41.

In order to control operations of the video camera device, a system controller 62 is provided. The system controller 62 is connected to the function buttons 17a, 17b, 17c and 17d to receive therefrom the function commands. The system controller 62 is also connected to the tape drive circuit 45 and the head drive circuit 47 of the video camera device for controlling operation thereof. Though not shown clearly in the drawing, the system controller 62 is further connected by various components of the video and audio signal processing circuit set forth above in a per se well known manner for controlling operation thereof. Since the circuit layout and functions of the control system for controlling the video camera circuit can be substantially the same as any types of video cameras, no detailed discussion about the construction or circuit connection and controlling operation to be performed will be required.

As set forth, the shown embodiment of the composite camera apparatus, according to the invention, allows simultaneous operation of the video camera device and the still camera device. When the composite camera apparatus is active, the strobe device may be operative in response to ON-set of the function button 17a and in response to depression of the shutter button 14, in synchronism with operation of the shutter mechanism 24. Smear or blooming which occurs by the influence of the stroboscopic light providing excessive light intensity for CCD image pick-up device 50, is not noticeable on one or several fields of video images made by the shown embodiment when reproduced on the video monitor. In order to facilitate this, the shown embodiment of the composite camera apparatus according to the invention is provided with a change-over switch 57 which is connected with the system controller 29 of the still camera device. The change-over switch 57 normally connects the CCD image pick-up device 50 to the video signal processing circuit 39. On the other hand, the change-over switch 57 is responsive to the strobe trigger signal for initiating strobo-flashing of the stroboscopic lamp 33 to turn the connection to connect a dummy signal source. In the shown embodiment, the dummy signal source comprises a direct current source 56, such as a battery. The direct current source 56 is so designed as to supply a direct current to the video signal processing circuit 39 as the dummy signal. The signal level of the dummy signal may be set at a lower level than a clip level so as not to make the reproduced image noticeable.

The switch position in which the change-over switch 57 establishes connection between the CCD image pick-up device 50 and the video signal processing circuit 39 will be hereafter referred to as the "normal switch position". The switch position in which the change-over switch 57 connects the dummy signal source to the video signal processing circuit 39 will be hereafter referred to as the "strobe position".

The change-over switch 57 may be so designed as to be held at the strobe position after once turned into the strobe position in response to the strobe trigger signal, for a given period of time. In practice, the change-over circuit 57 is held at the strobe position for a period corresponding to one field of video signal.

Figure 3A:
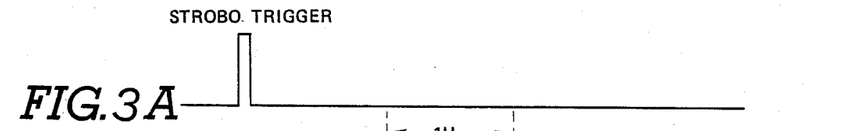
FIG. 3A shows timing of the strobe device operation.
Figure 3B:
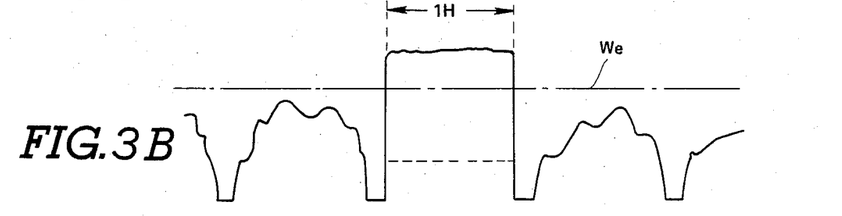
FIG. 3B shows the waveform of the video signal to be recorded on a video tape as recorded by the composite camera of the prior art.
Figure 3C:
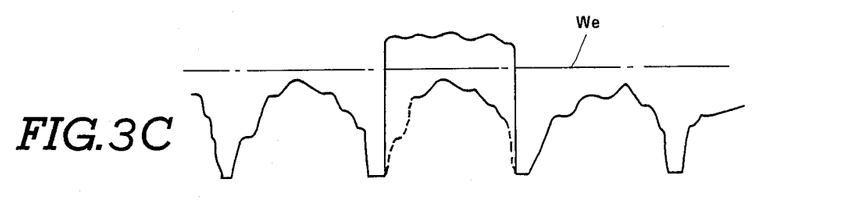
FIG. 3C shows the video signal to be recorded on the video tape by the preferred embodiment of the composite camera apparatus of FIGS. 1 and 2.

As will be seen from FIGS. 3A, 3B and 3C, the change-over switch 57, in practice, turns between the normal switch position and the strobe position in synchronism with the video signal. As seen from FIGS. 3B and 3C, if the video signal is not modified, the luminance level of the video signal at the field where the stroboscopic light is emitted, becomes substantially higher to cause smear or blooming. Therefore, according to the shown embodiment, the luminance level of the video signal of the field influenced by the stroboscopic light can be lowered below clip level We by modifying the video signal, as shown in FIG. 3C. Namely, in the practical change-over operation, the change-over switch 57 is responsive to the vertical synchronization signal occurring subsequent to occurrence of the strobe trigger signal of the system controller 29 of the still camera device, as seen from FIG. 3A. This delays change-over operation. This delay time allows the video signal of the leading field, which leading field of video image is picked up immediately before strobe operation.

After the period corresponding to the one field of the video signal expires, the change-over switch 57 returns to the normal switch position for connecting the CCD image pick-up device to the video signal processing circuit 39. Though it may be possible to measure the period to maintain the change-over switch 57 at the strobe position for switching to the normal position after the one field period expires, it would be convenient to switch the change-over switch from the strobe position to the normal switch position in response to the vertical synchronization signal received while the switch is in the strobe position.

By the foregoing operation, it becomes possible to replace one field of video signal picked-up when stroboscopic light is emitted, with the dummy signal. This makes the video image on which smear or blooming ocurs, not reproduced on the video monitor. Though the one field of dummy signal will be reproduced, it will be unnoticeable since the luminance level of the reproduced image is held lower to make the reproduced image dark.

Figure 4:
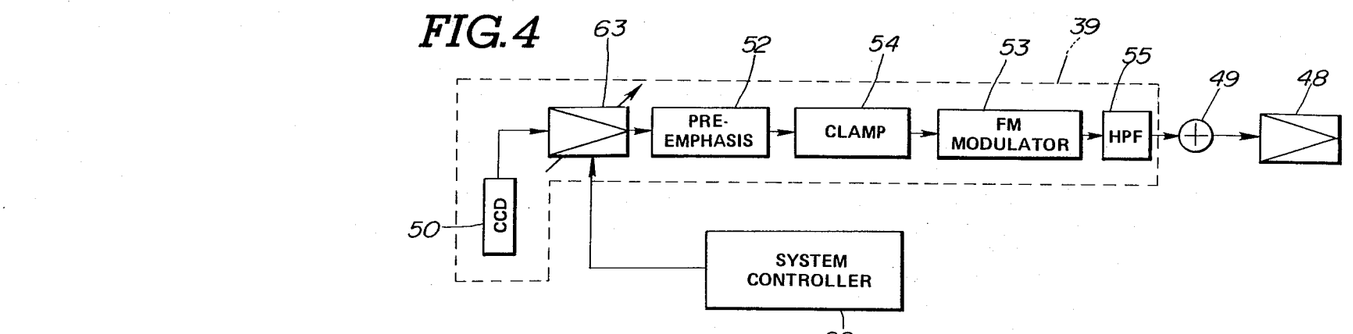
FIGS. 4 to 6 are schematic diagrams showing modification of the preferred embodiment of the composite camera apparatus of the present invention.

FIG. 4 shows the second embodiment of a circuit for the composite camera apparatus, according to the invention. Since most components of the second embodiment of the composite camera circuit are common to the foregoing first embodiment, only the portion which is different from the first embodiment is shown in FIG. 4. Consequently, the following discussion will be concentrated on the portion illustrated on FIG. 4.

The shown second embodiment of the composite camera circuit features a gain controlled amplifier 63 disposed between the CCD image pick-up device and the pre-emphasis circuit 52. This gain controlled amplifier 63 serves as a replacement of the dummy signal generator circuit of the foregoing first embodiment.

The idea of the second embodiment is to lower the gain in response to stroboscopic flashing so as to make the smear or blooming of the video image picked up at the occurrence of the stroboscopic flashing unnoticeable. As is well known, in the video image picked-up with stroboscopic flashing, excessive light intensity causes an excessively high luminance level of the video signal which causes smear or blooming. Therefore, by lowering the luminance level of the video signal to be reproduced, the smeared or bloomed image may become unnoticeable or will not substantially degrade the reproduced image.

Therefore, in the shown embodiment, the gain controlled amplifier 63 lowers the gain in response to the strobe trigger signal of the system controller 29 of the still camera device. The magnitude of the lowering of the gain may be set to lower the video signal level below the clip level so that the luminance level can be substnatially dropped for making the image to be reproduced substantially dark.

Similarly to the foregoing first embodiment, the gain controlled amplifier 63 is triggered in response to the vertical synchronization signal received subsequently to the strobe trigger signal of the system controller 29. In response to the vertical synchronization signal, the gain is dropped at a predetermined magnitude for lowering the video signal level at a given magnitude. The gain controlled amplifier 63 is held at the gain-lowered condition for a period corresponding to one field of the video image. The gain of the gain controlled amplifier 63 is returned to the normal level at a timing of the occurence of the next vertical synchronization signal. Therefore, with the shown construction, the second embodiment of the composite camera circuit is to successfully avoid degradation of the reproduced image quality by making the luminance level of the image picked up upon stroboscopic flashing unnoticeable.

Figure 5:
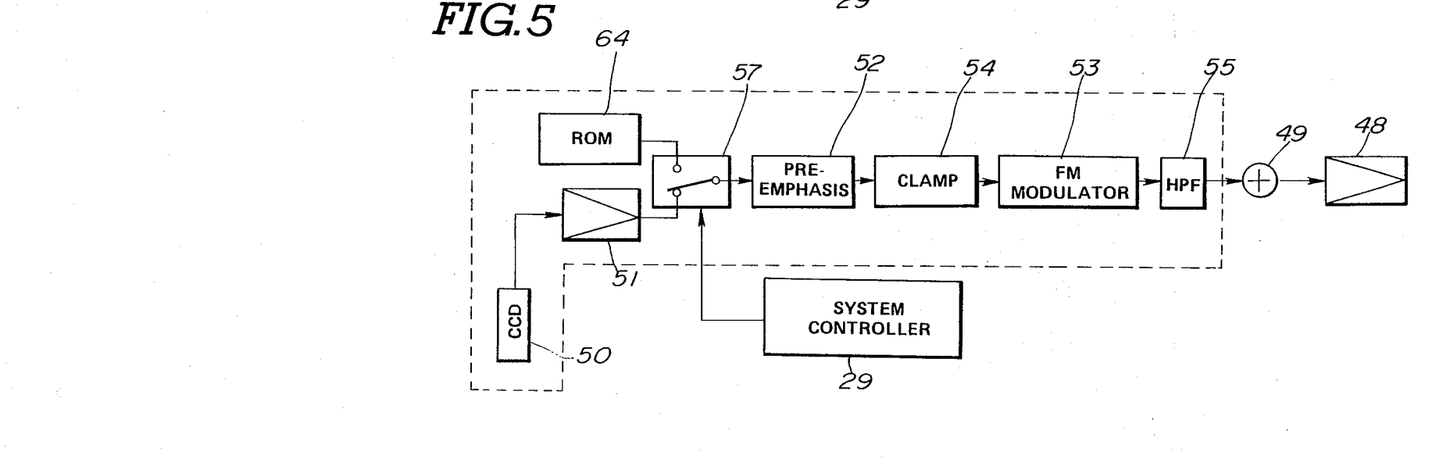

FIG. 5 shows the third embodiment of the principle portion of the composite camera circuit, according to the invention. In this embodiment, ROM 64, which stores a preset dummy signal of the substantially low luminance level, is employed in place of the dummy signal generator circuit of the first embodiment of the composite camera circuit set forth above.

ROM 64 is connected to the video signal processing circuit 39 via the change-over switch 57 which is, in turn, connected to the CCD image pick-up device 50. The change-over switch 57 is operated in substantially the same manner as discussed with respect to the foregoing first embodiment. Therefore, a connection between ROM 64 and the video signal processing circuit 39 is established in response to the strobe trigger signal and maintained for a period corresponding to the one field of the video signal.

Therefore, the dummy signal stored in ROM 64 may be recorded in place of one field of the video signal of the video image picked-up upon stroboscopic flashing and takes place to avoid degradation of the video image to be reproduced on the video monitor.

Figure 6:
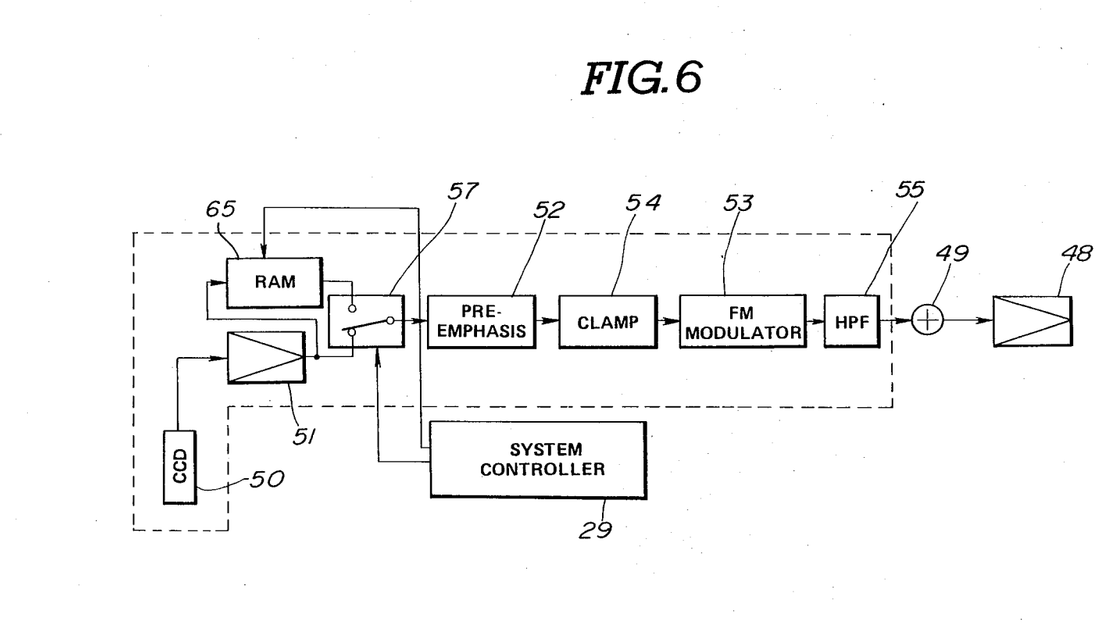

FIG. 6 shows the major portion of the fourth embodiment of the composite camera circuit, according to the invention. In the shown embodiment, RAM 65 is employed in place of ROM 64 in the former embodiment. In this embodiment, RAM 65 is connected to the amplifier 51 to continuously receives the video signal. RAM 65 is designed for storing one field of the video signal and to be updated with each field of the video signal.

RAM 65 is connected to the video signal processing circuit 39 via the change-over switch 57 which is disposed between the CCD image pick-up device and the video signal processing circuit 39. The change-over switch 57 operates as discussed with respect to the first embodiment for selectively connecting one of the CCD image pick-up device 50 and RAM 65 to the video signal processing circuit 39.

Therefore, when the stroboscopic flashing takes place, connection between CCD image pick-up device 50 and the video signal processing circuit 39 is broken and connection between RAM 65 and the video signal processing circuit 39 is established. At this time, since RAM 65 stores the video signal of one field ahead of the field of the video signal containing smeared or bloomed image data, the video signal of one field ahead of the smeared or bloomed field is fed to the video signal processing circuit 39.

With this arrangement, the fourth embodiment of the composite camera circuit voids degradation of the reproduced image due to the presence of the smeared or bloomed field.

As will be appreciated herefrom, the present invention is successful in avoiding degradation of the video image to be reproduced which may otherwise be caused by simultaneous operation of the video camera device and the still camera device with the stroboscopic lamp. Therefore, the invention fulfills all of the objects and advantages sought therefor.

Though the specific embodiments have been discussed for facilitating full understanding of the invention, the invention may be embodied in various ways and various constructions. For instance, it would be possible to simply disconnect the CCD image pick-up device and the video signal processing circuit for the period corresponding to one field of video signal upon stroboscopic flashing. Though this may make the video image to be reproduced on the video monitor discontinuous, it may not cause a substantial degradation of the reproduced image greater than that caused by reproduction of the smeared or bloomed field of video signal.

Therefore, as will be understood naturally from the discussion given hereabove in terms of the preferred embodiments of the invention, the invention may include all of the possible embodiments which allow simultaneous operation of the video camera device and the still camera device with the strobo-flashing, without causing substantial degradation of the video image to be reproduced on the video monitor.

What is claimed is:

1. A composite camera apparatus comprising:
    a video camera device for picking up a video image for recording a plurality of fields of video signals to be reproduced on a video monitor;
    a still camera device for [picking-up] picking up a still image for recording on a still image recording medium;
    a strobo-flashing device cooperative with said still camera device for [synchroneous] synchronous operation for emitting a strobo-flashing light in response to a still image pick-up operation of said still camera device; and
    means, incorporated in said video camera device, for modifying video image data in a field of said video signal [picked-up] picked up at a timing of the strobo-flashing operation for avoidance of influence of high intensity light.

2. A composite camera apparatus as set forth in claim 1, wherein said video camera device comprises means for picking up a video image to produce a plurality of consecutive fields of video signals, means for processing said video signals and means for recording said video signals on a video tape, and said video image data modifying means is disposed between said video image picking up means and said video signal processing means.

3. A composite camera apparatus as set forth in claim 2, wherein said modifying means is active in synchronism with the operation of said strobo-flashing device for modifying the video image data of the field picked up when said stroboscopic light is emitted.

4. A composite camera apparatus as set forth in claim 3, wherein said modifying means replaces one field of video signal with a preset dummy signal.

5. A composite camera apparatus as set forth in claim 4, wherein said modifying means includes a memory for storing one field of video signal immediately preceding the field to be modified, and said preset dummy signal is one field of video signal stored in said memory.

6. A composite camera apparatus as set forth in claim 3, wherein said modifying means lowers gain level of one field of video signal to be modified.

7. A composite camera apparatus comprising:
    a video camera device for picking up a video image for recording a plurality of fields of video signals to be reproduced on a video monitor;
    a still camera device for picking up a still image for recording on a still image recording medium;
    a strobo-flashing device cooperative with said still camera device for synchronous operation for emitting strobo-flashing light in response to still image pick-up operation of said still camera device; and means, incorporated in said video camera device, for modifying video image data in a field of said video signal picked-up at a timing of the strobo-flashing operation by replacing the corresponding field of video signal with a preset dummy signal for avoidance of influence of high intensity light.

8. A composite camera apparatus as set forth in claim 7, wherein said video camera device comprises means for picking up a video image to produce a plurality of consecutive fields of video signal, means for processing said video signal and means for recording said video signal on a video tape, and said video image data modifying means is disposed between said video image picking-up means and said video signal processing means.

9. A composite camera apparatus as set forth in claim 8, wherein said modifying means is active in synchronism with operation of said strobo-flashing device for modifying the video image data of the field picked up when said stroboscopic light is emitted.

10. A composite camera apparatus as set forth in claim 9, wherein said modifying means comprises a constant voltage source for supplying a constant voltage as said dummy signal.

11. A composite camera apparatus as set forth in claim 9, wherein said modifying means comprises a memory storing said preset dummy signal.

12. A composite camera apparatus as set forth in claim 9, wherein said modifying means includes a memory for storing one field of video signal immediately preceding the field to be modified, and said preset dummy signal is one field of video signal stored in said memory.

13. A composite camera apparatus comprising:

a video camera device for picking up a video image for recording a plurality of fields of video signals to be reproduced on a video monitor;

a still camera device for picking up a still image for recording on a still image recording medium;

a strobo-flashing device cooperative with said still camera device for synchronous operation for emitting strobo-flashing light in response to still image pick-up operation of said still camera device; and means, incorporated in said video camera device, for modifying video image data in a field of said video signal picked up at a timing of the strobo-flashing operation by lowering gain of the corresponding field of video signal for a given magnitude for avoidance of influence of high intensity light.

14. A composite camera apparatus as set forth in claim 13, wherein said video camera device comprises means for picking up a video image to produce a plurality of consecutive fields of a video signal, means for processing said video signal and means for recording said video signal on a video tape, and said video image data modifying means is disposed between said video image picking-up means and said video signal processing means.

15. A composite camera apparatus as set forth in claim 14, wherein said modifying means is active in synchronism with the operation of said strobo-flashing device for modifying the video image data of the field picked up when said stroboscopic light is emitted.

* * * * *